Figure 1:
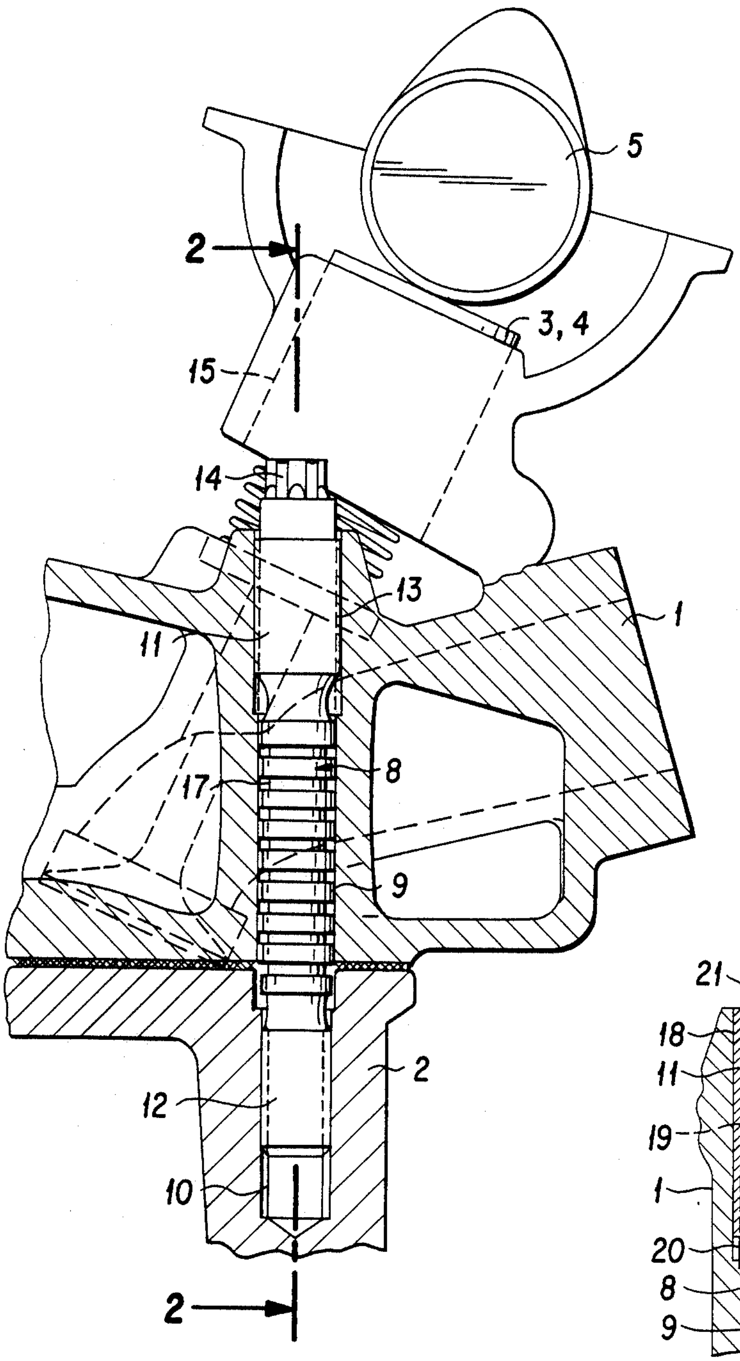

United States Patent [19]

Ruf et al.

[11] Patent Number: 4,745,892

[45] Date of Patent: May 24, 1988

[54] INTERNAL COMBUSTION ENGINE

[75] Inventors: Max Ruf, Obereisesheim; Erwin Korostenski, Oedheim, both of Fed. Rep. of Germany

[73] Assignee: Audi AG, Ingolstadt, Fed. Rep. of Germany

[21] Appl. No.: 874,578

[22] Filed: Jun. 16, 1986

[30] Foreign Application Priority Data

Jun. 28, 1985 [DE] Fed. Rep. of Germany ....... 3523191

[51] Int. Cl.[4] ................................................ F02F 7/00

[52] U.S. Cl. ......................... 123/193 CH; 123/195 R

[58] Field of Search ........ 123/193 R, 193 H, 193 CH, 123/195 R, 195 H

[56] References Cited

U.S. PATENT DOCUMENTS

| | | | |
|---|---|---|---|
| 3,046,953 | 7/1962 | Dolza | 123/195 R |
| 3,059,623 | 10/1962 | Booth et al. | 123/195 R |
| 4,430,968 | 2/1984 | Futakuchi et al. | 123/198 H |

FOREIGN PATENT DOCUMENTS

| | | | |
|---|---|---|---|
| 62538 | 7/1944 | Denmark | 123/193 CH |
| 310146 | 4/1929 | United Kingdom | 123/195 R |

*Primary Examiner*—Craig R. Feinberg
*Assistant Examiner*—M. Macy
*Attorney, Agent, or Firm*—Kane, Dalsimer, Sullivan, Kurucz, Levy, Eisele and Richard

[57] ABSTRACT

In an internal combustion engine, the cylinder head 1 is screw-fastened to the cylinder crank case 2 by means of differential screws 8, each of which has two threaded sections 11 and 12, of which section 11 has a larger outside diameter and a smaller pitch than the second section 12. The threaded sections 11 and 12 cooperate with corresponding internal threads 13 or 10 in the cylinder head 1 or in the cylinder crank case 2. As a result of the different pitches of the two threaded sections 11 and 12, there occurs a joint tensioning of the cylinder head 1 with the cylinder crank case 2, without a bearing surface for a screw head or a nut being required. The space requirement for the cylinder head fastening thereby becomes exceptionally small, so that the fastening can be provided at points, for example, between adjacent valves, at which no space would otherwise be available for a bearing surface for screw heads or nuts. Between the threaded sections 11 and 12 the shank of the differential screw 8 can be provided with a profile 17 which increases the "flow length" of the screw, whereby manufacturing tolerances with regard to the position of the internal threads 13 and 10 relative to each other can be compensated.

6 Claims, 2 Drawing Sheets

INTERNAL COMBUSTION ENGINE

The invention relates to an internal combustion engine of the type having a cylinder head attached to a cylinder crank case by a plurality of screw fasteners.

In most known internal combustion engines of this type, fastening of the cylinder head to the cylinder crank case is achieved either by screws or bolts with hexagonal heads or by nuts on screw studs screwed into the cylinder crank case, the screw heads or the nuts abutting against a flat surface of the cylinder head via insert discs or washers. In engines with four or more valves per cylinder and a relatively small cylinder bore, this type of fastening of the cylinder heads to the cylinder crank case frequently causes problems since there is inadequate space available to provide a bearing surface for the screw heads or nuts at the usual places, especially if valves with cup tappets are used. A compromise therefore has to be considered in regard to the arrangement of the cylinder head fastening screws and the valves or their gas-flow passages.

The problem underlying this invention is to provide an engine of the type stated above in which an optimal arrangement of the screw fasteners between the cylinder head and the cylinder crank case is made possible, even if the cylinders are of relatively small bore and four or more valves are provided per cylinder.

Broadly stated the invention consists in an internal combustion engine having a cylinder crank case and a cylinder head connected to the crank case by differential screw fasteners, each of which extends through a bore in the cylinder head and is screwed into a threaded bore in the cylinder crank case, each differential screw fastener having two threaded sections of which the first section has a larger external diameter and a smaller pitch than the second section, the bore in the cylinder head having an internal thread which corresponds to the first threaded section of the screw fastener and the bore in the cylinder crank case has an internal thread which corresponds to the second section of the screw fastener.

Since differential screws have no screw heads or nuts, no bearing surfaces for these elements need to be provided on the cylinder head, so that it is possible even with very restricted space conditions to provide for screw fasteners at positions where there would be no space available for bearing surfaces of screw heads or nuts.

The shank of the differential screw is preferably formed between the threaded sections with a contour which increases the "flow length" or elastic limit of the screw. Such screws, after reaching the normal limit of their extent, can still be tightened up to 600°, for example, without the force of the screw being reduced. By this means, manufacturing tolerances regarding the position of the internal threads in the bores of the cylinder head and the cylinder crank case relative to each other can be accommodated simply within certain limits.

To achieve the necessary screw prestress when the screw is tightened, it is necessary that a certain minimum number of thread turns of both threaded sections of the differential screw should remain effective, and therefore the internal thread in the bore in the cylinder head should be located at a specific predetermined distance from the thread of the threaded bore in the cylinder crank case. According to a preferred feature of the invention, and in order to maintain this distance independently of manufacturing tolerances, a separately formed threaded sleeve is provided with an external thread which engages a corresponding internal thread in the bore in the cylinder head, this sleeve having an internal thread which cooperates with the first threaded section of the differential screw. To prevent the threaded sleeve being rotated simultaneously and screwed in further when the differential screw is turned and tightened, the external thread of the threaded sleeve and the cooperating internal thread are of different "hand" from the threads of the differential screw, that is to say, left-handed, if the threads of the differential screw are right-handed. Apart from accurate adjustment of the spacing between the threads which cooperate with the threaded sections of the differential screw, the abutment surface for the screw force in the cylinder head, which is normally composed of a light metal alloy, can be increased by means of such a threaded sleeve, since the threaded sleeve can be made as long as desired and the abutment surface consists of the projection of the flank of one thread turn multiplied by the total number of thread turns.

Figure 4:
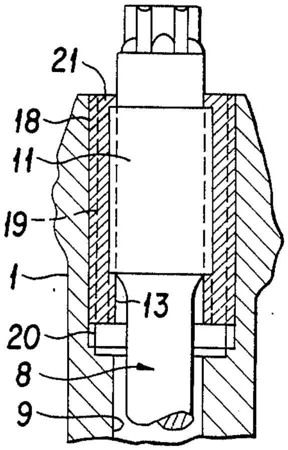
Figure 2:
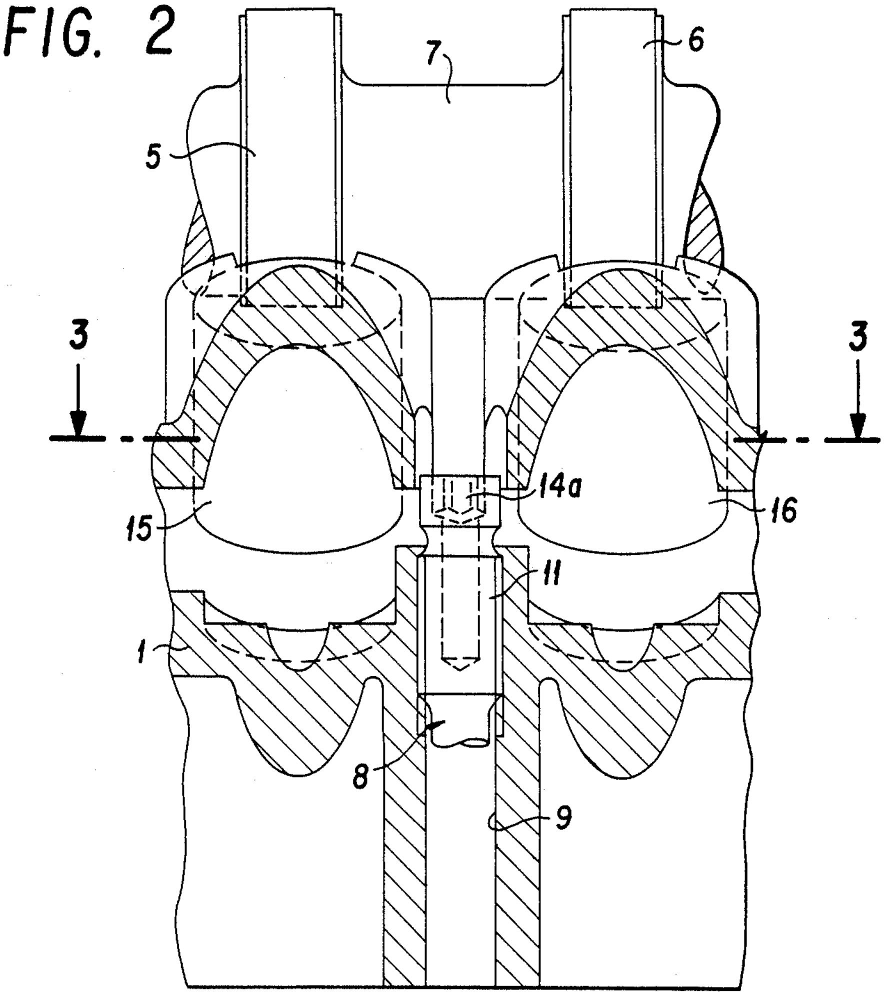
Figure 3:
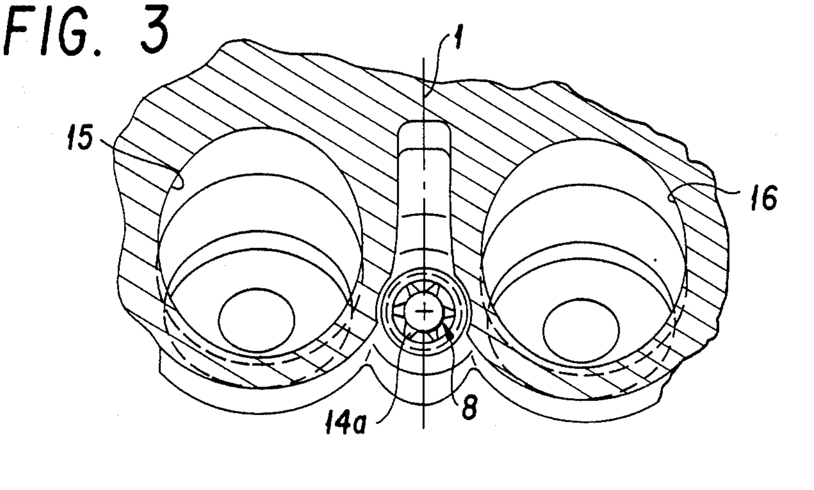

The invention may be performed in various ways and one specific embodiment will now be described by way of example with reference to the accompanying drawings, in which:

FIG. 1 is a side elevation partly in section of a cylinder head and the adjacent part of a cylinder crank case, FIG. 2 is a section of the cylinder head on the line 2—2 in FIG. 1, FIG. 3 is a section on the line 3—3 in FIG. 2, and FIG. 4 is a section similar to FIG. 2 showing a modification.

Referring first to the construction illustrated in FIG. 1, a cylinder head of an engine is shown at 1 and a cylinder crank case at 2. The cylinder head 1 in this embodiment has two inlet valves and two outlet valves for each cylinder, of which only the two inlet valves are shown in the drawings. The inlet valves have cup tappets 3 or 4, which are actuated by cams 5 or 6 on an overhead camshaft 7.

The cylinder head 1 is fastened to the cylinder crank case 2, between adjacent valves, by differential screws, of which just one screw 8 is illustrated. To receive each differential screw 8, the cylinder head 1 has a bore 9 and the cylinder crank case 2 is formed with a threaded bore 10. The differential screw 8 has two threaded sections 11 and 12, of which the first threaded section 11 has a larger outside diameter and a smaller pitch than the second threaded section 12. The bore 9 in the cylinder head 1 has an internal thread 13 which corresponds with the first threaded section 11, and the bore 10 in the cylinder crank case 2 has an internal thread which corresponds with that of the second threaded section 10. At its end adjacent the cylinder head 1 the differential screw 8 is formed with an external polygonal profile 14 which does not exceed the outside diameter of the screw and is intended to be engaged by a tool. Instead of an external polygon 14, an internal polygonal socket 14*a* may be used, as illustrated in FIG. 2.

As can be seen particularly from FIGS. 1 and 3, the differential screw 8 occupies only limited space, and can be accommodated without any noticeable reduction in dimensions of the walls of the cylinder head 2 which surround the bores 15 and 16 for receiving the cup tappets 3 and 4. FIG. 3, in particular, shows that no space would be available for a screw head or a nut and the essential lock washer of a normal cylinder head screw fixing.

When the differential screw 8 is tightened the cylinder head 1 is pressed hard against the cylinder crank case 2 on account of the different pitches of the threaded sections 11 and 12. The threaded section 11 may, for example, have a M14×1.44 thread and the threaded section 12 an M11×1.5 thread.

The shank of the differential screw 8 between the threaded sections 11 and 12, has an external contour in the form of a plurality of spaced circumferential grooves 17, by which the "flow length" or elastic limit of the screw is increased. By "flow length" is meant the angular range over which the screw can be further tightened after having reached the limit of its extent before the screw force decreases and permanent elongation occurs. As a result of this special profile manufacturing tolerances with regard to the position of the internal thread 13 relative to the threaded bore 10 can be accommodated within certain limits, since the screw can be further tightened after having reached the limit of its extent by up to two turns, depending upon the design of the contour, without the screw force declining. The special profile does not need to be in the form of circumferential grooves, as illustrated, but may also be helical, for example.

In the example of FIG. 4, the internal thread 13 which cooperates with the first threaded section 11 of the differential screw 8 is not actually formed in the bore 9 in the cylinder head 1, but in a threaded sleeve 18 which has an external thread 19 which has a different "hand" from the internal thread 13 and is screwed into a corresponding internal thread 20 in the bore 9. By appropriate screwing-in and positioning of the threaded sleeve 18, an accurately defined spacing or interval can be selected between the internal thread 13 and the thread of the threaded bore 10 in the cylinder crank case, such that a minimum number of thread turns of both threaded sections 11 and 12 of the differential screw 8 endure after tightening. Because the threads 19 and 20 are of a different hand from the internal thread 13, the threaded sleeve 18 is prevented from being turned as well and screwed in further when the differential screw 8 is screwed in and tightened.

For the purpose of screwing in the threaded sleeve 18, radial grooves (not shown) are provided on its front face 21 designed to be engaged by a suitable tool.

We claim:

1. An internal combustion engine having a cylinder crank case and a cylinder head connected to the crank case by differential screw fasteners, each of which extends through a bore in the cylinder head and is screwed into a threaded bore in the cylinder crank case, each differential screw fastener having two threaded sections of which the first section has a larger external diameter and a smaller pitch than the second section, the bore in the cylinder head having an internal thread which corresponds to the first threaded section of the screw fastener and the bore in the cylinder crank case having an internal thread which corresponds to the second section of the screw fastener each said differential screw fastener being free screw heads and screw nuts so as to retain said first threaded section of said differential screw fastener within said cylinder head solely by differences in the pitch of the first and second sections.

2. An internal combustion engine as claimed in claim 1, in which the end of each screw fastener adjacent the cylinder head has a polygonal profile which does not exceed the external diameter of the screw threaded sections, for application of a tool.

3. An internal combustion engine as claimed in claim 2, in which a shank of the differntial screw fastener located between the threaded sections has a profile which increases a resulting "flow length" or elastic limit of said differential screw fastener with increasing entry.

4. An internal combustion engine as claimed in claim 1, in which a shank of the differential screw fastener located between the threaded sections has a profile which increases a resulting "flow length" or elastic limit of said differential screw fastener with increasing entry.

5. An internal combustion engine as claimed in claim 1 or claim 4, in which the internal thread which cooperates with the first threaded section of the fastener is formed in a threaded sleeve which has an external thread of a different hand from the internal thread and is screwed into a corresponding internal thread in the bore in the cylinder head.

6. An internal combustion engine having a cylinder crank case and a cylinder head connected to the crank case by at least one differential screw fastener having first and second threaded sections of which the first section has a larger external diameter and a smaller pitch than the second section, wherein said differential screw fastener extends through a bore in the cylinder head and is screwed with its second threded section into a correspondingly threaded bore in the cylinder crank case, the bore in the cylinder head having an internal thread which corresponds to the first threaded section of said differential screw fastener, the end of said differential screw fastener adjacent the cylinder head having a polygonal profile which does not exceed the external diameter of the screw threaded sections, and a shank of said diffrential screw fastener located between the threaded sections having a profile which increases a resulting "flow length" or elastic limit of said differential screw fastener with increasing entry, said at least one differential screw fastener being free of screw heads and screw nuts so as to retian said first threaded section of said differential screw fastener within said cylinder head solely by differences in the pitch of the first and second sections.

* * * * *